(12) United States Patent
Yan et al.

(10) Patent No.: US 7,574,084 B2
(45) Date of Patent: Aug. 11, 2009

(54) PHOTODETECTOR COUPLED TO A PLANAR WAVEGUIDE

(75) Inventors: Ming Yan, Pleasanton, CA (US); Ping Peter Xie, Cupertino, CA (US); Anthony J. Ticknor, Cupertino, CA (US)

(73) Assignee: NeoPhotonics Corporation, San Jose, CA (US)

( * ) Notice: Subject to any disclaimer, the term of this patent is extended or adjusted under 35 U.S.C. 154(b) by 0 days.

(21) Appl. No.: 11/894,843

(22) Filed: Aug. 22, 2007

(65) Prior Publication Data

US 2008/0044131 A1 Feb. 21, 2008

Related U.S. Application Data

(63) Continuation of application No. 11/040,906, filed on Jan. 21, 2005, now Pat. No. 7,272,273.

(51) Int. Cl.
*G02B 6/42* (2006.01)
(52) U.S. Cl. .............................. 385/39; 385/27; 385/49; 385/129
(58) Field of Classification Search .................. 385/2, 385/129–132, 27, 39, 49
See application file for complete search history.

(56) References Cited

U.S. PATENT DOCUMENTS

| | | | |
|---|---|---|---|
| 3,934,061 A | 1/1976 | Keck et al. | |
| 4,990,990 A | 2/1991 | Albrecht et al. | |
| 5,134,671 A | 7/1992 | Koren et al. | |
| 5,343,542 A * | 8/1994 | Kash et al. | 385/31 |
| 5,391,869 A | 2/1995 | Ade et al. | |
| 5,493,393 A | 2/1996 | Beranek et al. | |
| 5,535,231 A | 7/1996 | Lee et al. | |
| 5,622,750 A | 4/1997 | Kilian et al. | |
| 5,945,720 A | 8/1999 | Itatani et al. | |
| 5,991,487 A | 11/1999 | Sugiyama | |
| 6,615,615 B2 | 9/2003 | Zhong et al. | |
| 6,738,545 B1 | 5/2004 | Purchase et al. | |
| 6,795,600 B1 | 9/2004 | Ticknor | |
| 6,823,112 B2 | 11/2004 | Deliwala | |
| 2003/0228415 A1 | 12/2003 | Bi et al. | |
| 2004/0151227 A1 | 8/2004 | Bhowmik et al. | |
| 2004/0161186 A1 | 8/2004 | Crafts et al. | |
| 2004/0179785 A1 * | 9/2004 | Komiya et al. | 385/49 |

FOREIGN PATENT DOCUMENTS

WO WO97/05513 2/1997

* cited by examiner

Primary Examiner—Frank G Font
Assistant Examiner—Eric Wong
(74) Attorney, Agent, or Firm—Dardi & Associates, PLLC; Elizabeth O. Shipsides; Peter S. Dardi

(57) ABSTRACT

An improved electro-optical system has a planar waveguide coupled to a photodetector through a transparent substrate. The planar waveguide is within a planar optical structure that can be part of optical communication network. The photodetector is positioned to receive light that passes from the waveguide through the transparent substrate. The photodetector can be electrically coupled to electrical circuitry along the transparent substrate for connection to a electrical apparatus. Corresponding methods for forming the electro-optical structure are described. These improved electro-optical systems can be used for terminating an optical transmission system at an end user or a local network associated with a group of end users.

19 Claims, 7 Drawing Sheets

PHOTODETECTOR COUPLED TO A PLANAR WAVEGUIDE

CROSS REFERENCE TO RELATED APPLICATIONS

This application is a continuation of U.S. patent application Ser. No. 11/040,906 to Yan et al. filed on Jan. 21, 2005, now U.S. Pat. No. 7,272,273 entitled "Photodetector Coupled to a Planar Waveguide," incorporated herein by reference.

FIELD OF THE INVENTION

The invention relates to an electro-optical system with a photodetector optically connected to a planar waveguide to connect the electrical subsystem with the optical subsystem. The invention further relates to methods for forming the electro-optical system and methods of using the electro-optical system.

BACKGROUND OF THE INVENTION

Optical networks primarily transport information from a source to a destination. The production, organization and consumption of this information is presently done almost exclusively in the electronic domain. Furthermore, it can be desirable for information within an optical network to be relayed in an electronic format between various segments of the optical network. To provide communication between the optical components and the electronic components, the optical data stream is converted to an electronic data stream by a photodetector. An electronic relay along an optical network can function to determine the route necessary for the next segment of the optical network and/or to "groom" the data stream to enhance the fidelity of the overall data link. Then, the data stream is reconverted into an optical signal using an optical emitter and directed into the appropriate next segment of the optical network, possibly being broadcast to multiple destinations through multiple segments. When a data stream reaches its ultimate destination, the optical signal is converted to an electrical signal with a photodetector, and the electrical signal is passed through a network interface or network appliance to the system consuming or otherwise using the signal, such as a computer or video-display device, such as a television.

In the time period roughly from 1998 to 2002, there were orders-of-magnitude increases in the capacity of communications systems for carrying digital information between distant locations, i.e., "long-haul," and to a certain extent, within metropolitan regions. This increase in capacity was enabled to a significant degree by advances in the design and production of optical components for managing multiple simultaneous streams of digital optical data through ultra-fine wavelength discrimination. In its various forms, this wavelength discrimination is referred to as "Wavelength Division Multiplexing" or "WDM." An example of particular components that have contributed to the capacity increase is planar lightwave circuits. With planar lightwave circuits, the circuits can be printed as compact, two-dimensional optical circuits in contrast with optical fiber-based systems using three-dimensional assemblies of discrete components assembled to micron-level precisions. Planar lightwave circuits are analogous with respect to form, impact and scalability to integrated circuit technology where complex electronic circuits are printed onto planar substrates and replicated in large quantities. Similarly, the replication process for planar optical circuits can provide a reduced cost when significant quantities of identical circuits are produced.

With the utilization of planar optical circuits, optical fibers generally are used for the long-range data transmission while the planar optical circuits are used for compact configuration of optical devices. Suitable interfaces are typically patterned as part of the planar lightwave circuit to connect the optical fibers to the planar optical circuits to form the optical subsystem. The optical subsystem is connected to electrical components to form the electro-optical data handling system. Connection of the electrical components to a planar optical circuit involves different considerations from the connection of electrical components to an optical fiber.

SUMMARY OF THE INVENTION

In a first aspect, the invention pertains to an electro-optical system comprising a planar optical structure and an electro-optical interface. The planar optical structure comprises a planar waveguide that terminates at the edge of the planar structure. The electro-optical interface comprises a transparent substrate attached at the edge of the planar structure to receive light from the waveguide and a first photodetector secured to the transparent substrate at a position to receive the light from waveguide through the transparent structure.

In a further aspect, the invention pertains to a method for forming an electro-optical system comprising a planar optical structure comprising a planar optical waveguide. The method comprises attaching a transparent substrate to the planar optical structure and fastening a photodetector to the transparent substrate. The photodetector is aligned with the planar waveguide.

In another aspect, the invention pertains to a method for interfacing an optical communication system with an electrical circuit. The method comprises converting an optical signal into an electrical signal wherein the optical signal is transmitted to an photodetector from a planar waveguide. The optical detector is mounted on a transparent substrate that is attached to the planar waveguide to form an optical pathway substantially directly from the planar waveguide through the transparent substrate to the detector.

DETAILED DESCRIPTION OF THE INVENTION

Figure 1:
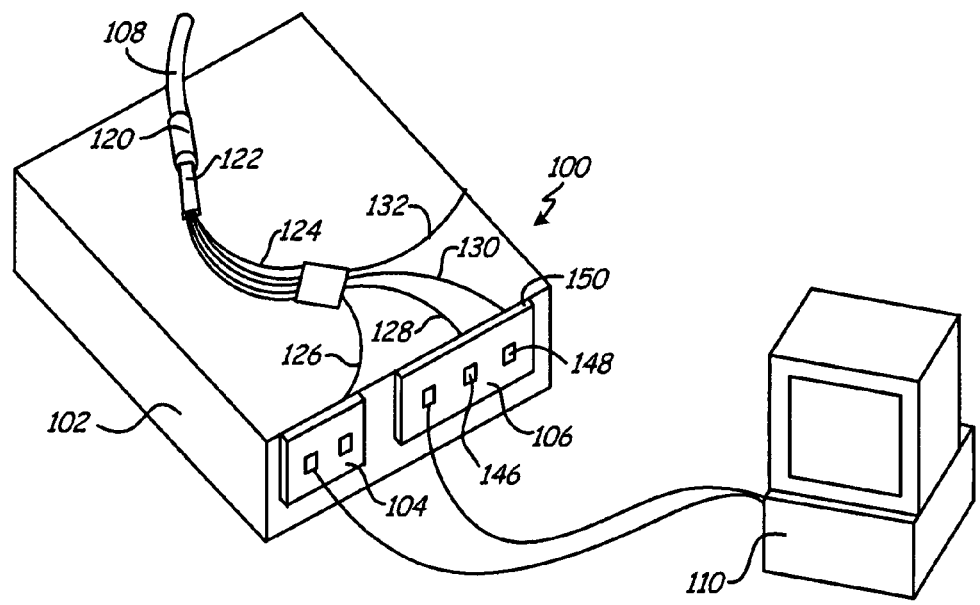
FIG. 1 is a schematic perspective view of an electro-optical system connecting a fibber optic-based communication network with an electrical apparatus through an electro-optical interface.

As described herein, improved interfacing of a photodetector to a planar waveguide makes use of a transparent substrate to mount the photodetector in position to receive the light from the waveguide. The resulting electro-optical system avoids the need for a lens to direct light from the waveguide to the photodetector while providing for efficient detection of light from the waveguide and using assembly techniques that can be automated for mass production. Desired electrical connections can be placed onto the substrate to facilitate the electrical connection of the photodetector with an electrical circuit, which may or may not be located at least partially on the substrate. The planar waveguide generally is located within a planar optical structure that can have additional optical devices integrated with the waveguide. The improved electro-optical system and corresponding processes can result in cost savings through reducing components, requiring less processing time and/or reducing waste through more uniform processing results. The photodetector can be hermetically sealed onto the substrate to protect the photodetector. Suitable attachment approaches can be used to secure the substrate along the edge of the planar optical structure to align the photodetector to receive light from the planar waveguide.

An optical communication component interfaces with an electrical apparatus at its origin and at its termination such that the data being transferred originates and terminates in a form used by electronic devices. Specifically, at the origin, a photoemitter generates an optical signal relating to an electrical signal from the apparatus controlling the photoemitter. At the termination, a photodetector converts the optical signal back to an electrical signal that is interpreted by a suitable electrical apparatus. The termination at the photodetector can be an ultimate termination of an optical transmission system or an intermediate termination between two segments of an optical transmission system. Generally, the optical transmission system comprises a portion based on optical fiber that carries the optical signal over significant distances. In embodiments of particular interest, the optical communication system further comprises a planar optical structure with at least a planar optical waveguide.

The planar optical waveguide of the planar optical structure can be interfaced with a photodetector to connect between the optical and electrical subsystems. Thus, the planar optical structure can interface between one or more optical fiber transmission lines and one or more electrical apparatuses, although the planar structure can be in optical communication with other optical components, such as additional planar optical circuits, in addition to or as an alternative to optical fibers. As described herein, the planar optical structure has a waveguide that directs an optical signal to the edge of the planar optical structure. Light leaving the edge of the planar optical structure is directed to a photodetector to provide an electrical signal. The photodetector is mounted onto a transparent substrate such that light transmitted through the substrate can strike the light sensitive portion of the photodetector. The transparent substrate is correspondingly mounted onto the edge of the planar optical structure to align the photodetector to receive light from the planar waveguide. The waveguide can be part of a planar optical circuit. The planar optical circuit can comprise the waveguide and optionally one or more additional desired optical components, such as a multiplexer.

The transparent substrate can be formed from an optical glass, a crystalline inorganic material, a polymer or a combination thereof. In general, the transparent substrate can advantageously have an index-of-refraction similar to the core of the waveguide. The substrate can be coated on one or both surface with an antireflective coating. Also, the selection of the substrate material generally takes into account the wavelength of light being transmitted such that the material is appropriately transparent. For example, for 1.55 micron wavelengths, silicon would be suitable due to its transparency.

The photodetector can be mounted on the substrate using a suitable mount such as solder, an adhesive, or a combination of solder and transparent organic underfill adhesive, such as an optical acrylate adhesive (e.g., AT6001 from NTT-AT Corp.) or a transparent electronic-grade silicon polymer (e.g., products available from Dow-Corning, Gelest, and Shin-Etsu Chemical). Solder is placed away from the photoactive region of the photodetector, which a transparent underfill can be placed also along the photoactive region. If a transparent underfill is placed along the photoactive region, an antireflective coating on the photoactive surface of the photodetector can be selected to account for the approximate index-of-refraction of the underfill rather than the index-of-refraction of air.

In some embodiments, a plurality of photodetectors is mounted on the same transparent substrate. The transparent substrate can be equipped with electrical connections to integrate the photodetector(s) into an electrical circuit. The electrical circuit components on the substrate can be simply conductive interconnects providing a conductive path to a connector region for connection of the electrical circuit of the substrate with an external electrical circuit, such as a flexible circuit, although additional optional electrical components can be mounted on the substrate. For example, capacitors, resistors, inductors, filters and/or integrated electrical-circuit dice, such as integrated amplifiers, digital memory chips and/or signal processors, can be integrated into the circuit on the substrate. Additional connection pads can be used to connect wires from devices to the conductive paths along the circuit.

Some photodetectors are susceptible to degradation over time due to assaults from the environment. For example moisture can cause performance degradation over time. Thus, it may be desirable to put a protective cap or other protective layer over the photodetector. The protective cap, which can be metal or other suitable material, can form a hermetic seal forming a protective barrier for the photodetector. The electrical connections can be covered with a dielectric, such as a glass layer, to electrically insulate them from the cap and provide additional protection.

The dimensions of the transparent substrate generally are selected based on appropriate positioning relative to the planar optical structure, while having the photodetectors aligned with the waveguide. However, in some embodiments, the substrate has a substantially rectangular shape with dimensions on each side of no more than about 20 millimeters (mm). The thickness of the substrate can be based on reasonable handling and taking into account spread of the light beam based on the size of the light sensitive portion of the photodetector. For appropriate materials for the transparent substrate with suitable index matching and potentially including optical anti-reflective coatings, the light loss from the transmission through the transparent substrate should not be unduly adverse.

Generally, for processing a large number of substrates, a plurality of structures are simultaneously patterned onto a larger portion of material which are later cut to form a plurality of substrates. The electrical conductors can be patterned on the substrate using photolithography, patterned deposition or the like. Solder or other sealing material can be placed on the substrate for the placement of the photodetectors and/or other components, such as electrical components. The photodetectors, amplifiers, electrical chips, capacitors and the like can be placed using a pick-and-place machine or other suitable equipment, such as apparatuses used for assembling electrical circuits. Positioning marks can be placed on the substrate to facilitate the placement of the components using a visualization system coupled with the pick-and-place machine or other apparatus. Optionally, a thin inorganic dielectric can be layered over the metal traces, and/or a cap can be placed over the photodetectors and/or other components to hermetically seal them. The order of processing steps can be selected based on the particular materials as described further below.

Relative to conventional systems, the glass substrate interface described herein avoids the need for a lens. Thus, the cost of the lens is eliminated. Furthermore, systems based on a lens also need the careful placement and support of the components. Generally, the lens directs light into a sealed detector component, conventionally referred to as a TO-can, with the photodetector sealed within. Electrical connections protrude from the sealed component to provide electrical connection with the photodetector. Generally, the lens would be carefully placed several millimeters from the waveguide surface. In contrast, with the present system, the thickness of the transparent substrate is selected to provide the appropriate light path from the waveguide to the photodetector without a lens. The processing steps generally involve straightforward approaches adapted from formation of electrical circuits, and these processing steps generally are amenable to significant automation for cost reductions upon mass production. Thus, the cost of integration of the photodetector with the planar optical circuit can be significantly reduced relative to conventional approaches, and the approach can be scaled for large quantity production. Furthermore, the critical mechanical complexity of the assembly is greatly reduced, providing increased assembly yield and a significantly more mechanically robust system. Thus, introduction of the improved electro-optical integration approaches described herein can significant reduce the integration costs and mass production costs while simultaneously increasing the reliability of the product.

Electro-Optical Systems

An electro-optical system has a planar optical structure connected with an electro-optical interface that may be further connected to an electrical apparatus. The planar optical structure comprises a planar waveguide, which may be integrated with additional optical components. In particular, the planar optical structure generally can be a component within an optical communication network. The electro-optical interface comprises a transparent substrate and a photodetector mounted on the transparent substrate. In some embodiments, electrical conductors are placed along the substrate to connect the photodetector to other electrical components and/or to an electrical connector. Additionally or alternatively, wire connections can be made to the photodetector and/or other electrical components mounted on the substrate surface. The wire connections can connect to conductive pads on the transparent substrate or to external devices. Furthermore, a cap and/or other protective coating can be placed over photodetector and other portions of the substrate surface to protect the photodetector and possibly other components.

An example of an electro-optical system 100 is depicted in FIG. 1. Electro-optical system 100 comprises a planar optical structure 102, electro-optical interfaces 104, 106 in which the planar optical structure 102 is connected to an optical fiber 108 and the electro-optical interface is electrically connected to electrical apparatus 110. In this embodiment, planar optical structure 102 comprises an optical fiber interface 120, a waveguide 122 optically connected to optical fiber interface 120, an optical device 124 optically connected to waveguide 122, and waveguides 126, 128, 130, 132 optically connected to optical device 124. Waveguides 126, 128, 130 terminate at the edge of planar optical structure 102 where they are optically connected to electro-optical interfaces 104, 106. Waveguide 132 can be directed to another electro-optical device that can introduce light into waveguide 132 or detect light from waveguide 132, as desired. The formation and structure of planar optical structures is described further, for example, in U.S. application Ser. No. 10/414,443 to Bi et al., entitled "Coating Formation By Reactive Deposition," U.S. Pat. No. 6,615,615 to Zhong et al., entitled "GePSG Core For Planar Lightwave Circuit," U.S. Pat. No. 3,934,061 to Keck et al., entitled "Method of Forming Planar Optical Waveguides," and U.S. Pat. No. 5,622,750 to Kilian et al., entitled "Aerosol Process For The Manufacture of Planar Waveguides," all four of which are incorporated herein by reference. While this embodiment has four waveguides interfacing with the edge of the planar optical structures, in other embodiments, there may be more or fewer waveguides interfacing with the edge of the planar optical structure, such as one, two, three, five, six or more.

Figure 2:
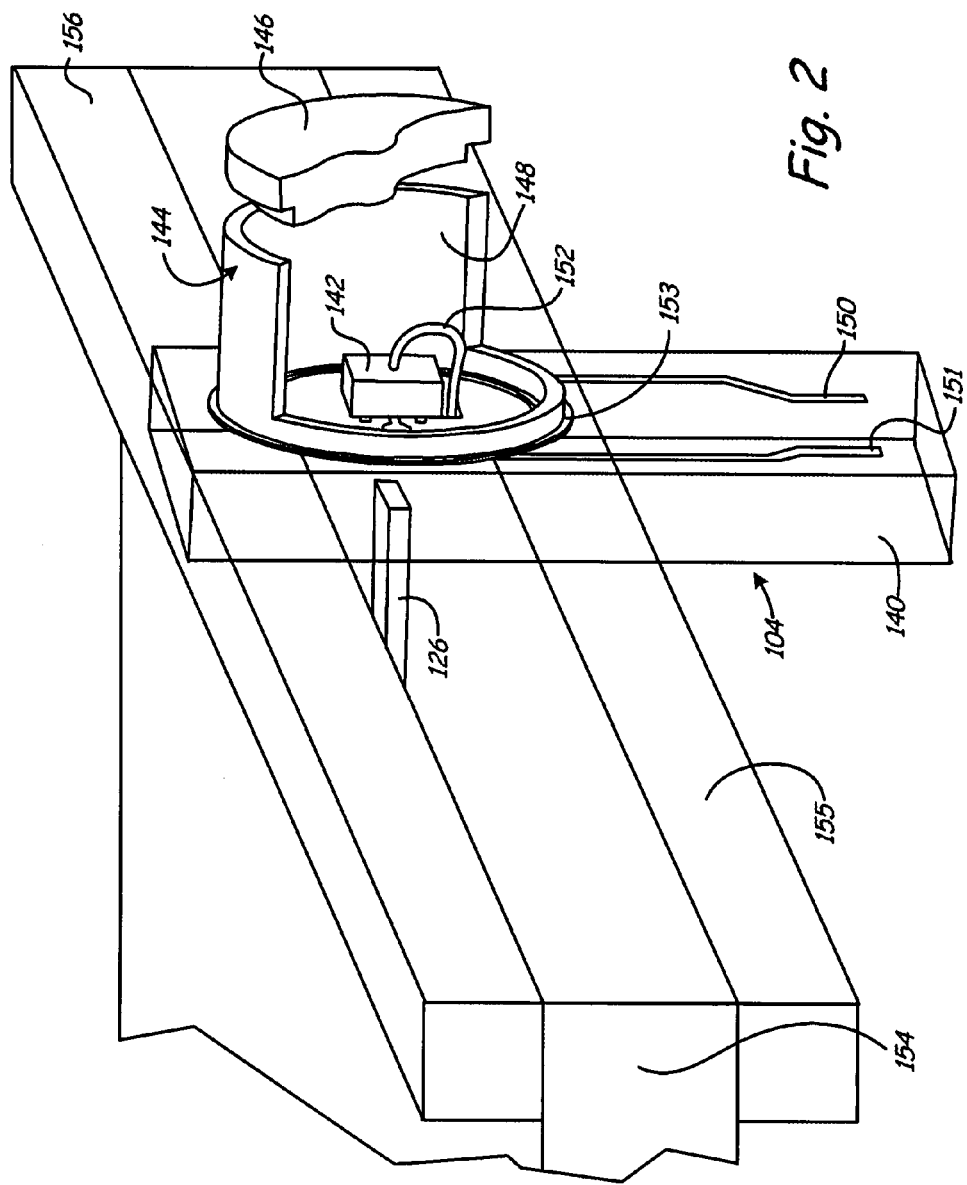
FIG. 2 is a fragmentary perspective view of an electro-optical interface connected to a planar optical structure.

FIG. 2 displays an expanded view of waveguide 126 coupling to electro-optical interface 104. Electro-optical interface 104 comprises a transparent substrate 140, photodetector 142 covered with a cap 144. In this embodiment, cap 144 has a lid 146 that is ultimately sealed to cap walls 148. Electrical traces 150, 151 provide for external electrical interface. Bonding wire 152 can be used to connect the back-face electrical contact of photodetector 142 with electrical trace 150, or alternatively photodetector 142 can incorporate both of its electrical contacts on the front face and both can be directly connected to electrical trace 150 through solder connections or the like. Cap 144 forms a hermetic seal and can be electrically isolated from traces 150, 151 by glass seal 153.

Due to the relative temperatures suitable for certain attachment steps, there are certain configurations in which the temperature of bonding the cap to the substrate would be generally higher than the temperature applied for bonding the photodetector or other components to the substrate, e.g., if the cap is to be bonded to the substrate using a glass frit. In these cases, it would be correspondingly desirable to bond the cap to the substrate prior to bonding the photodetector to the substrate. Furthermore, for these configurations, it is advantageous that cap 144 comprise separate walls 148 and lid 146, such that the cap walls 148 can be bonded to substrate 140 with the lid 146 unattached. With the cap walls in place, photodetector 142 is subsequently placed on substrate 140 within cap walls 148. Then, subsequent to bonding and connecting photodiode 142 to substrate 140, lid 146 is bonded to walls 148 to complete the formation of cap 144.

Electro-optical interface 104 is aligned along planar optical structure to align waveguide 126 with photodetector 142. Reinforcement blocks 155, 156 can be used to further stabilize the structure and alignment during testing and use.

Electro-optical interface 106 has two photodetectors 146, 148 on a transparent substrate 150. In general, a single transparent substrate can have a single photodetector, or a plurality of photodetectors such as two, three or more, with the only constraint being size limitations and other processing constraints. Thus, for example, to terminate the three waveguides in FIG. 1, the electro-optical systems can have a single electro-optical interface with three photodetectors, three individual electro-optical interfaces each with a single photodetector, or two electro-optical interfaces, as shown, with one having two photodetectors and the second having one photodetector, although the grouping can be reversed with the termination of waveguides 126, 128 being located on a single electro-optical interface.

A planar optical structure generally is formed with an optical glass that can be deposited over a flat substrate, such as silicon wafer or the like, that may be subsequently cut to form the optical chips. However, the planar optical structure can be formed from other optical materials, such as crystalline inorganic materials, polymers, which can be organic polymers or silicon-based polymers, combinations of these other materials or combinations of these other optical materials with optical glasses. The planar optical components can be formed within a core layer that is textured to form confined light passageways. Single isolated passageways generally are referred to as waveguides. Dynamic optical devices can involve, for example, thermo-optically activated attenuators and switches for the transfer of energy between adjacent light passageways and pump-driven optical amplifiers. Static optical devices can involve, for example, splitting and/or combining light passageways, optical signal distribution, interconnection and wavelength-based filtering. Generally, the optical passageways are surrounded by a cladding material of a different index-of-refraction, generally a lower index-of-refraction, such that light is confined at least to a significant degree to the light passageways through the physical principles of electromagnetic propagation.

In general, the waveguides that terminate at the electro-optical interfaces can be part of an integrated optical circuit, although the waveguide can be the only planar optical component associated with the planar optical structure. Additional optical components within the planar optical circuit include, for example, one or more of 1×N optical splitters/couplers, optical switches, wavelength division multiplexers, demultiplexers. optical add/drop multiplexers, amplifiers, optical attenuator, optical filter, optical polarizer, optical circulator, phase shifter and combinations thereof. Connector 120 for the optical fiber holds the optical fiber in place and directs the light propagation between the optical fiber and a planar waveguide or other planar optical component. As shown in FIG. 1, optical device 124 is a multiplexer that splits the wavelength domain of the common signal in waveguide 122 into four wavelength domains that are coupled respectively to waveguides 126, 128, 130, 132.

Figure 3:
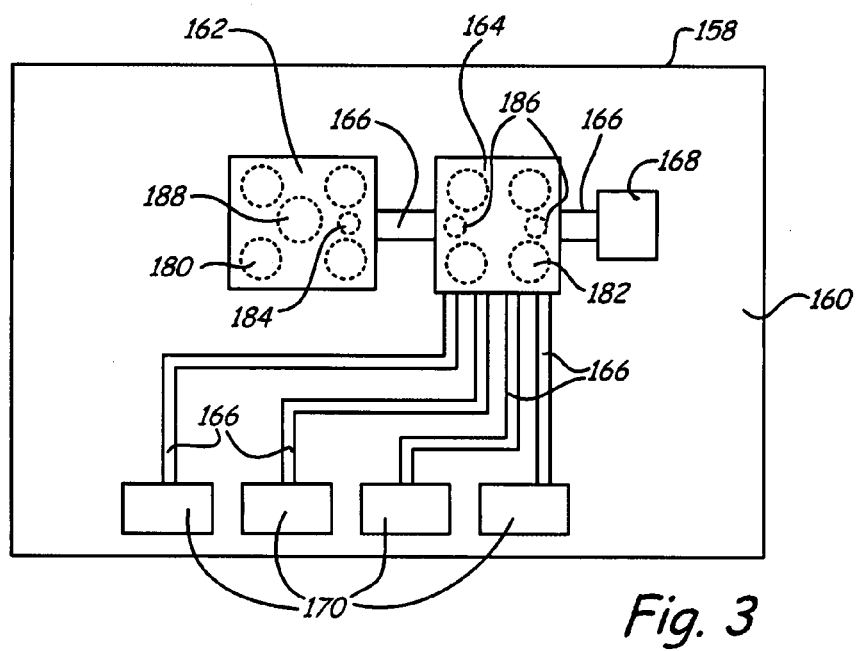
FIG. 3 is a top view of a representative electro-optical interface with a single photodetector and a single electrical component with hidden structure shown in phantom lines.

A schematic of a general electro-optical interface is shown in FIG. 3. As shown in FIG. 3, electro-optical interface 158 comprises a transparent substrate 160, a photodetector 162, an electrical component 164, electrical interconnects 166, a wire connector pad 168 and connector pads 170. The number of each component within the electro-optical interface can be selected as appropriate for the selected use. The transparent substrate can be formed of any suitable material that is substantially transparent to the selected wavelengths to be transported through the substrate. Thus, the selection of the material for the substrate depends on the particular wavelengths to be transmitted. In general, the substrate can be formed, for example, from optical glass, an inorganic crystalline material, or a polymer. Suitable optical glasses include, for example, silcate glasses, which can be doped to alter the optical and/or processing properties. Suitable inorganic crystalline materials include, for example, synthetic minerals such as quartz, sapphire and the like. Suitable polymers include, for example, organic polymers, such as polyimides and polymer blends. For some desired wavelengths, crystalline, polycrystalline, or amorphous silicon can be used as the substrate since it is transparent to infrared communications wavelengths greater than about 1.1 microns that are commonly used in fiber-optic networks.

The substrate can have a thickness from about 0.03 mm to about 2.0 mm, in further embodiments from about 0.06 mm to about 0.50 mm and in additional embodiments from about 0.10 mm to about 0.30 mm. While the substrate can have various shapes, it can be convenient to have a substantially rectangular substrate due to placement and processing considerations. For example, a substantially rectangular substrate can have dimensions in some embodiments on each side of the rectangle from about 0.5 mm to about 20 mm and in further embodiments from about 1 mm to about 10 mm. A person of ordinary skill in the art will recognize that additional ranges within and beyond the explicit ranges of thickness and linear dimensions are contemplated and are within the present disclosure. Furthermore, the substrate can have an antireflective coating on one or both surfaces. Antireflective coatings are known and can be based on the particular wavelength range of light to be utilized. The coatings can be single layer or multiple layer antireflective coatings. The coatings can be further designed to exhibit high reflectance for wavelengths that could undesirably couple to the photodetector. These wavelengths are consequently rejected from the photodetector, enhancing the performance of the electro-optical system.

In embodiments of particular interest, the substrate can be patterned to form electrical interconnects at selected locations. In addition, the electrical interconnects can be supplemented with wire connections. Specifically, the patterned electrical interconnects can further form pads for the connection of a wire or other electrical contacts. Thus, referring to FIG. 3, patterning can be used to form the particular pattern of electrical interconnects 166, conductive wire connector pad 168 and connector pad 170. Generally, the electrical interconnects can be formed with one or more layers of metal, such as copper, silver, gold, platinum, aluminum, titanium, tungsten, nickel, combinations thereof or alloys thereof, as a metal trace. At least one of the metal layers can advantageously be an excellent electrical conductor, such as copper, silver, gold, aluminum or related alloy. Other layers may be added to provide enhanced properties, such as adhesion to the substrate or wetting of solder. Alternatively, other conductive materials, such as other metals, conductive polymers, conductive carbons or combinations thereof, can be used. The electrical interconnects can be patterned, for example, using photolithographic techniques or other masking approaches. For example, a thin layer of metal can be deposited over the substrate surface or a portion thereof. Then, the desired pattern is applied in a layer of organic photoresist. The portions of the metal layer not protected by the photoresist can be etched away by immersion in an appropriate acidic solution. After patterning the metal layer, the photoresist can then be removed with a solvent solution leaving the desired conductive pattern as depicted in FIG. 3.

In general, the electrical interconnects can also form a series of conductive connector pads for the attachment of an electrical connector, which can be individual wires, a flexible circuit, a clip style electrical connector with pins soldered to the series of connector pads, or the like. An electrical connector in contact with the substrate can be connected to an electrical apparatus using a wired connection or the like. As shown in FIG. 3, there are four connector pads 170, although a larger or smaller number of connector pads can be used, such as two, three, five, six, or more, as appropriate for connection to the particular electro-optical interface.

Solder pads can be placed to facilitate anchoring of the photodetector and/or electrical components as well as to facilitate the electrical connection of wires, flexible circuits, electrical connectors, photodetectors, electrical components and/or other components to the conductive interconnects. The solder can be placed onto the component for delivery and/or onto the transparent substrate for delivery. Thus, solder pads can be used for structural purposes as well as the formation of electrical connections. For example, solder pads 180 for securing the device are shown in dashed phantom lines in FIG. 3 under photodetector 162, and solder pads 182 for securing the device are shown below electrical component 164. Similarly, solder pads 184, 186 provide for connection of photodetector 162 and electrical component 164, respectively, to electrical interconnects 166. The solder can be heated to softening to connect adjacent elements with the solder.

The substrate surface can be covered to protect the components. For example a thin layer of glass can be deposited over the layer, for example, using chemical vapor deposition, flame hydrolysis, light reactive deposition or the like. Flame hydrolysis, chemical vapor deposition and light reactive deposition approaches are described in the cited references above with respect to the formation of planar optical waveguides. This thin glass layer can have a thickness generally from about 0.01 microns to about 20 microns and in further embodiments from about 0.05 to about 10 microns. A person of ordinary skill in the art will recognize that additional ranges of glass layer thickness within the explicit ranges are contemplated and are within the present disclosure. This thin glass layer can be etched, e.g., with reactive-ion etching, for example, to expose selected underlying electrical interconnects. Alternatively, the deposition of the glass can be patterned to directly expose the selected patterned electrical interconnects. Alternatively, a glass frit can be applied. A glass frit can be obtained commercially with a desired size. The glass frit can be sealed with heat and pressure. However, the glass can have a relatively high softening temperature such that the solder may melt at the glass frit processing temperature in some cases. The glass frit generally would have a thickness of at least about 10 microns.

After depositing a glass seal, a band of solder, adhesive or other sealing material can be placed along the glass for the placement of a cap. Metal caps have been used in the art on non-planar device headers to protect photodetectors. The metal cap is bonded to the solder ring by heating to soften the solder. For embodiments with a glass frit protective layer, the walls of the cap can be attached prior to the placement of the photodetector. The glass frit generally does not cover the photodetector or other electrical components that are soldered into place. After the glass frit is sealed, the photodetector and other soldered components are positioned through the opening in the cap and glass frit and are soldered into place. Then, the top of the cap is soldered into place. The cap should have dimensions that cover the components to be protected.

Photodetectors can be optimized for analog or digital operation. Suitable photodetectors are commercially available. For example, suitable analog photodetectors include for example model GIP8003 photodiode die available from GigaComm Corporation (www.gigacomm.com.tw). Suitable digital photodetectors include, for example, model GIA9007 photodiode die available from GigaComm Corporation (www.gigacomm.com.tw). The photodetectors generally have an active detection area along one surface of the device. The photoactive surface is positioned toward the glass substrate such that light from a waveguide in the planar optical structure can pass through the transparent substrate to strike the active area. For example, the center of the surface can be photosensitive. As shown in FIG. 3, the photoactive portion 188 is shown with a dotted phantom line below photodetector 162.

Figure 4:
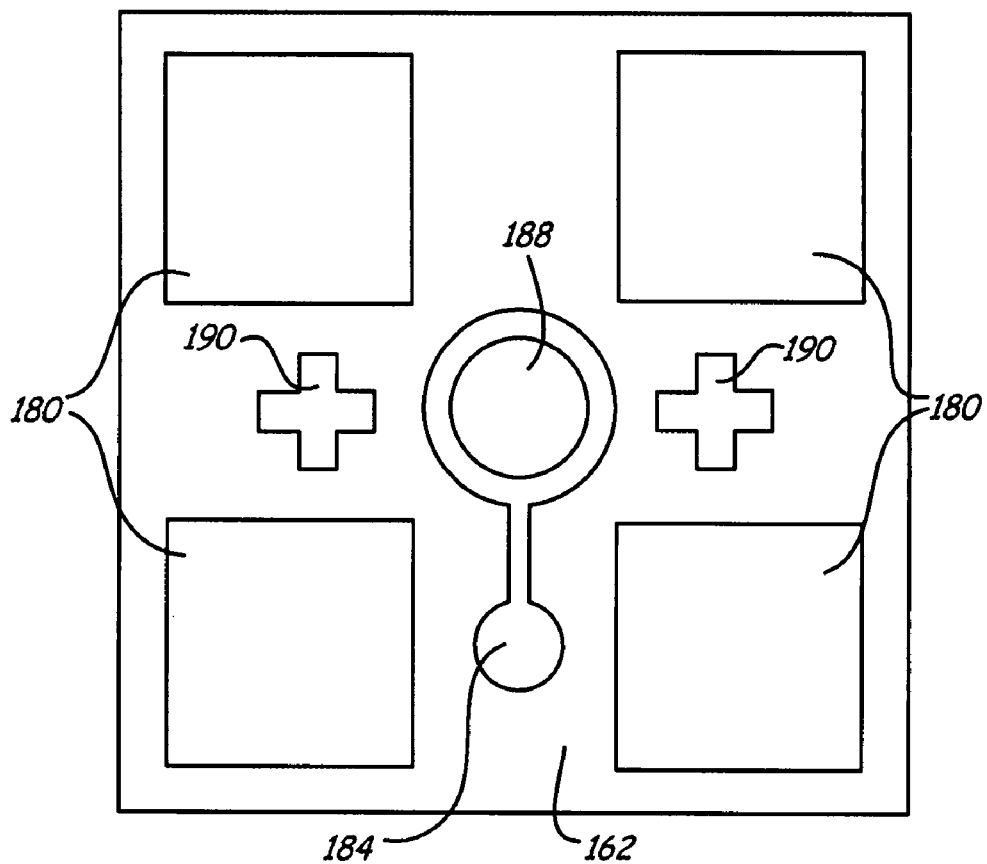
FIG. 4 is a bottom view of a representative photodetector.

A front surface view, corresponding to the photodetector bottom view in FIG. 3, of photodetector/photodiode 162 is shown in FIG. 4. Solder pads 180 provide for the bonding of the photodetector to the transparent substrate. Solder pads 180 can be bonded, for example, directly to the substrate or in connection with a grounded electrical interconnect. In this embodiment, solder pad 184 provides for electrical connection of one terminal of photodetector 162 with an electrical interconnect that is generally not grounded. The other electrical terminal of photodetector 162 is, in this example, to be taken from the back-surface of the photodiode die. Photoactive area 188 is located in the center of the surface of photodetector 162. Alignment marks 190 can be used to facilitate placement of photodetector 162.

Other electrical components suitable for placement on the transparent substrate include, for example, an analog amplifier, such as a transimpedance amplifier (TIA) or other semiconductor amplifier, a capacitor, an inductor, a resistor, or combinations thereof. In general, various electrical components can be supplied on the electro-optical interface as long as space allows. An analog amplifier connected to a photodiode can boost the output current and increase the noise immunity of the signal. A capacitor can be electrically connected between the photodiode and the amplifier to filter off the DC bias. A combination of capacitors, inductors, and resistors can be interposed as a network to match the output impedance of a photodiode to the input impedance of an integrated amplifier. A capacitor and/or inductor can be placed near the analog photodiode to stabilize and filter the bias voltage. Simple passive components such as resistors, capacitors and inductors may be placed outside of the hermetic environment, in appropriate embodiments, since these electrical components may contain organic compositions that could contaminate the hermetic environment. A person of ordinary skill in the art will readily recognize that the present devices described herein provide for the disposition upon the substrate of nearly any electronic component that is not unreasonably large size nor is intended to dissipate power at an unreasonably high rate, the limits of reasonability depending on the physical application.

EXAMPLES OF SPECIFIC EMBODIMENTS

In some specific embodiments of interest, the electro-optical interface can be used with a planar optical structure having a triplexer. Such a system would be suitable to provide subscriber termination for a passive-optical network that can be used to provide voice, video and data services. While the electro-optical systems described herein can be used to interface a wide range of planar optical devices with a wide range of end uses based on the disclosure herein, the description of some specific embodiments can provide further details that would be generalizable to other systems. In one representative embodiment, voice and data can be delivered as a digital optical stream at a wavelength of 1490 nm, video would be delivered as an analog-modulated optical stream at 1550 nm and return voice and data would be sent back into the optical communications network from end users at 1300 nm. The triplexer can split and/or recombine these wavelengths for transmission or detection as appropriate. The reception can be handled using a single electro-optical interface with two photodetectors. The video signal can be received, for example, with an analog photodetector, and the voice and data signal can be received with a digital photodetector. The return signal would be introduced into the planar optical structure using a separate device.

Figure 5:
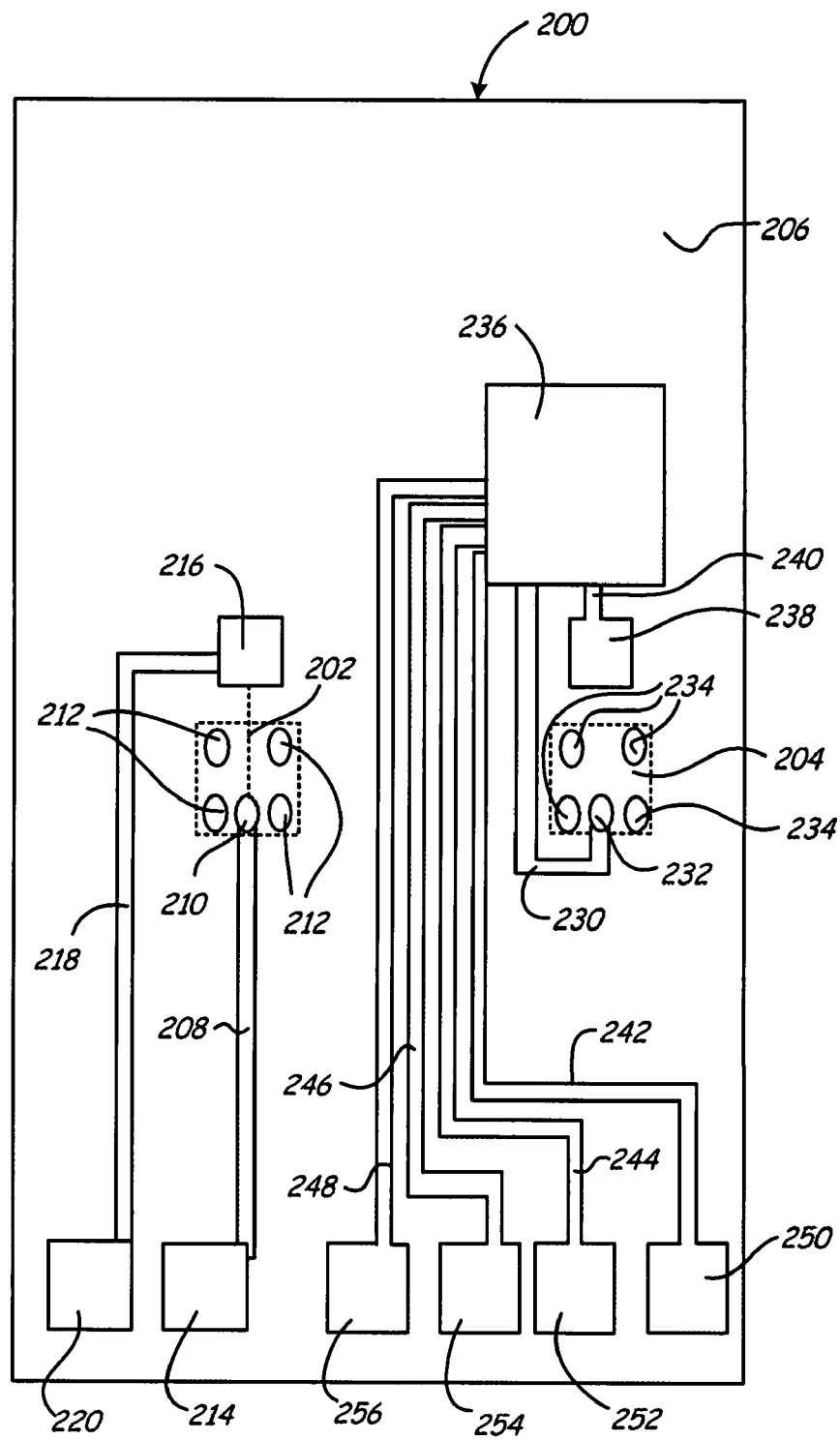
FIG. 5 is a top view of an embodiment of an electro-optical interface with a digital photodetector and an analog photodetector.

Referring to an embodiment in FIG. 5, electro-optical interface 200 has a digital photodetector 202 and an anolog photodetector 204 on a transparent substrate 206. Digital photodetector 202 is electrically connected to electrical interconnect 208 at solder pad 210. Solder pads 212 secure digital photodetector 202 in place on substrate 206. Electrical interconnect 208 is electrically connected to connector pad 214. Wire connector pad 216 is electrically connected to electrical interconnect 218, which in turn is electrically connected to connector pad 220. A wire can be connected from the back surface of digital photodetector 202 to wire connector pad 216 such that connector pads 214, 220 present opposite poles of digital photodetector 202.

Analog photodetector 204 is electrically connected to electrical interconnect 230 at solder pad 232. Solder pads 234 secure analog photodetector 204 to substrate 206. Electrical interconnect 230 is electrically connected to transimpedance amplifier 236. Wire pad 238 is connected to electrical interconnect 240, which is in turn electrically connected to transimpedance amplifier 236. A wire can be connected from the analog photodetector 204 to wire pad 238 to connect the two poles of photodetector 204 to amplifier 236. Transimpedance amplifier 236 is further connected to electrical interconnects 242, 244, 246, 248 that are respectively electrically connected to connection pads 250, 252, 254, 256, whereupon power can be applied to the amplifier and signal can be transmitted from the amplifier. Connector pads 214, 220, 250, 252, 254, 256 can provide for connection of electro-optical interface 200 with a flexible circuit, a multiple pin connector or the like.

Figure 6:
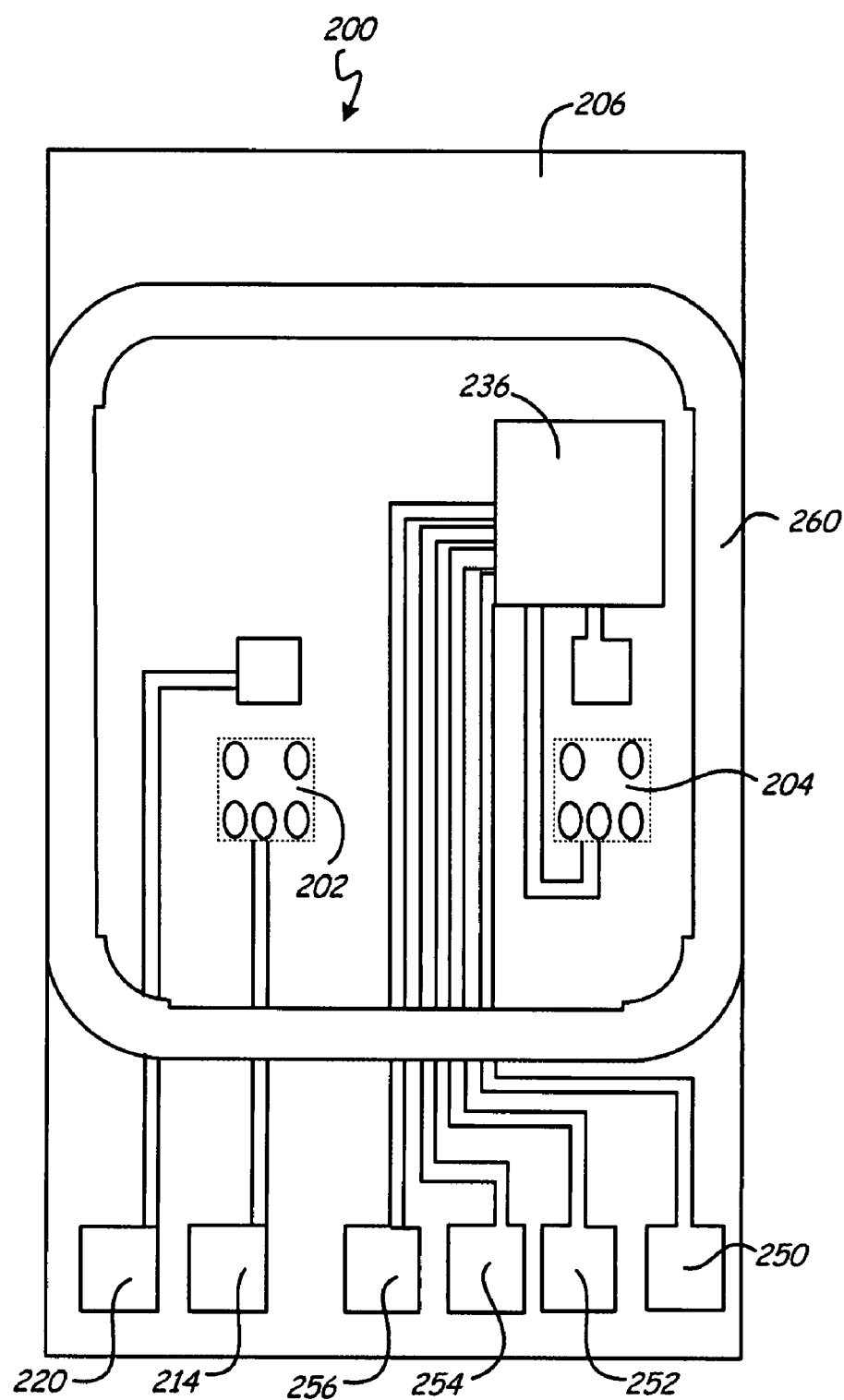
FIG. 6 is a top view of the electro-optical interface of FIG. 5 with an added solder ring for securing a sealing cap.

Referring to FIG. 6, electro-optical interface 200 is shown with a solder ring 260 for the attachment of a cap to form a hermetic seal over photodetectors 202, 204 and amplifier 236. Generally, a glass layer or the like is placed under solder ring 260 and possibly other portions of the substrate surface to avoid short circuit of the device by the solder ring and to provide protection of the surface. Generally, electrical connectors 214, 220, 250, 252, 254, 256 remain uncovered for appropriate connection.

Figure 7:
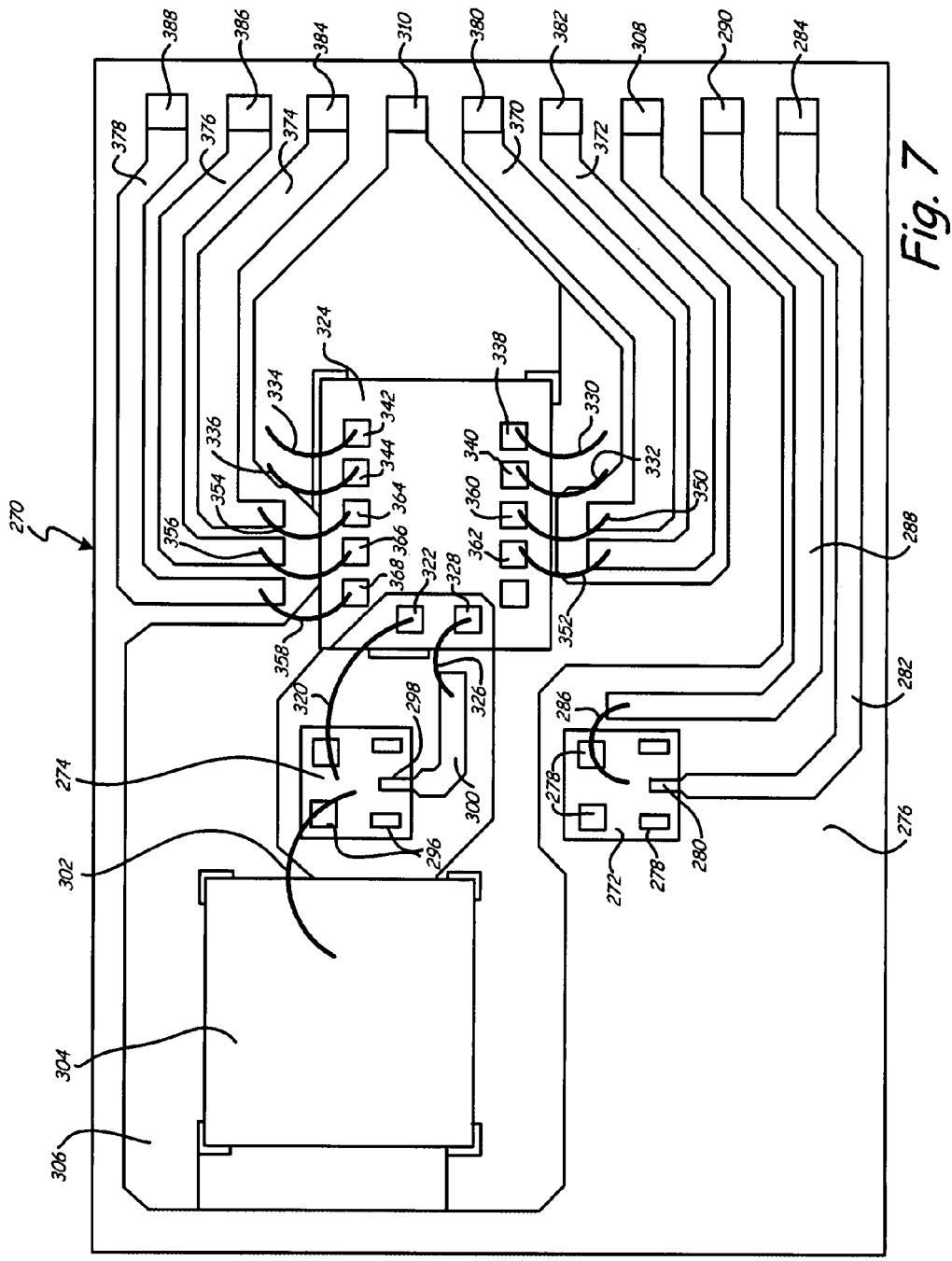
FIG. 7 is a top view of an alternative embodiment of an electro-optical interface with a digital photodetector and an analog photodetector.

An alternative embodiment is depicted in FIG. 7. Electro-optical interface 270 comprises a digital photodetector 272, an analog photodetector 274 on transparent substrate 276. Digital photodetector 272 has four anchoring solder pads 278 to secure digital photodetector 272 to transparent substrate 276. Solder pad 280 electrically connects digital photodetector 272 to electrical interconnect 282. Electrical interconnect 282 is electrically connected to connector pad 284. Wire 286 electrically connects digital photodetector 272 with electrical interconnect 288, which is correspondingly electrically connected to connector pad 290. Connector pads 284, 290 are connected to the opposite poles of digital photodetector 272.

Analog photodetector 274 is secured to transparent substrate 276 with four solder pads 296. Solder pad 298 electrically connects analog photodetector 274 with electrical interconnect 300. Wire 302 electrically connects analog photodetector 274 with capacitor 304. Capacitor 304 is also electrically connected to electrical interconnect 306. Electrical interconnect 306 also is electrically connected to connector pads 308, 310, which generally are connected to ground. Wire 320 connects analog photodetector 274 with contact 322 on amplifier 324, and wire 326 connects electrical interconnect 300 with contact 328 on amplifier 324. Wires 330, 332, 334, 336 electrically connect amplifier 324 respectively at contacts 338, 340, 342, 344 with electrical interconnect 306, which extends under amplifier 324. In addition, wires, 350, 352, 354, 356, 358 respectively connect contacts 360, 362, 364, 366, 368 on amplifier 324 with electrical interconnects 370, 372, 374, 376, 378. Electrical interconnects 370, 372, 374, 376, 378 are electrically connected with connector pads 380, 382, 384, 386, 388, respectively. Connector pads 294, 290, 308, 310, 382, 380, 382, 384, 386, 388 can be used to connect electro-optical interface 270 with a flexible circuit, pin connector or the like.

In some embodiments, the analog photodetector 274 is held under a reverse-voltage potential on the order of a few volts to improve response time and fidelity. A bias-stabilizing filter can be used to reduce variations in the reverse-voltage that can leak into the output and corrupt the signal with noise. Suitable bias-stabilizing filters can be a capacitor in parallel with the photodetector, such as capacitor 304 of FIG. 7, and/or an inductor in series with the photodetector. Thus, in FIG. 7, capacitor 304 functions as a bias-stabilizing filter in this embodiment. Close placement of the element(s) to the photodetector results in improved bias-stabilization.

Figure 8:
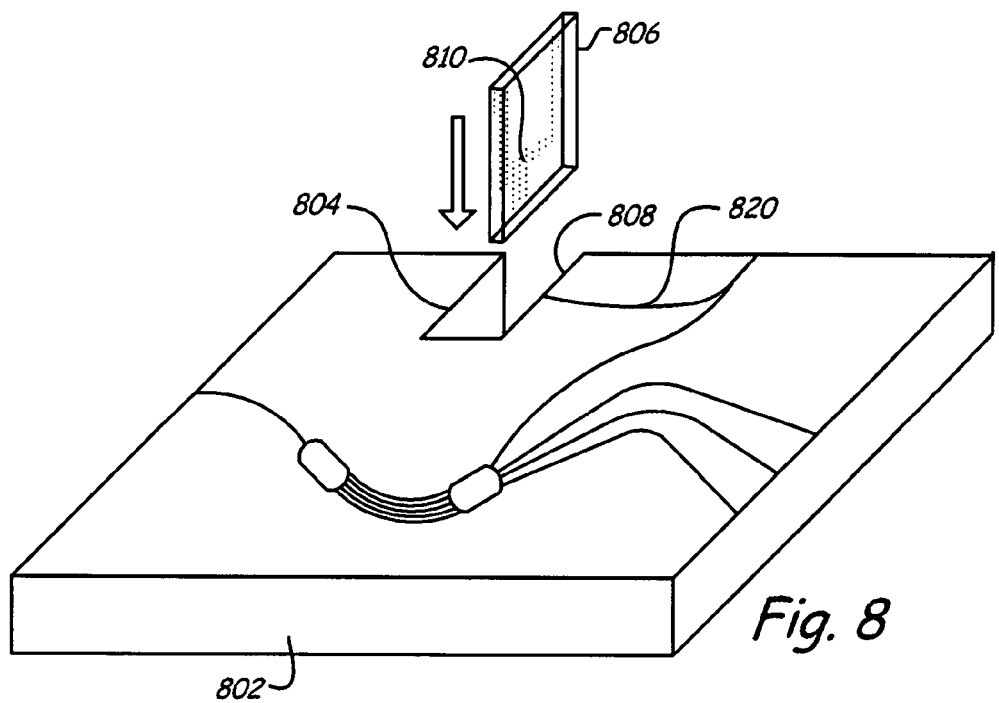
FIG. 8 is an exploded top perspective view of a representative electro-optical interface with a single photodetector prepared to be coupled to a waveguide terminated at an internal edge of a planar optical structure with the interface shown adjacent to the placement position at the internal edge of the planar optical structure.

Another alternative embodiment is shown in FIG. 8. Edges terminating waveguides can be fabricated at locations interior to the body of the planar waveguide structure by creating a slot, well, hole or the like in the planar structure. These interior edges can be created using standard cutting techniques, for instance reactive-ion etching, wet etching, water-jet cutting, ultrasonic milling, laser cutting, controlled grinding or a combination thereof. In FIG. 8, planar-waveguide structure 802 is shown with a slot 804 cut into a portion forming an interior edge 808 that terminates waveguide segment 820. Slot 804 also provides adequate clearance from structure 802 such that the electro-optic interface assembly 806 can be inserted into the slot to couple photodetector 810 to waveguide 820.

Assembly

While some of the processing approaches and corresponding processing constraints are discussed above, processing considerations for assembling the electro-optical system are summarized below. In general, the order of some processing steps may be influenced by the materials being used and the corresponding constraints applied by the materials. Furthermore, alignment of the photodetector with the planar waveguide should be done appropriately such that the system performs to specifications. The layout of the electro-optical interface with electrical interconnects and the like is generally performed on a prepared transparent substrate surface. This layout then fixes the desired relationship between the substrate and the planar optical structure. Then, the processing further involves the careful placement of the photodetectors, electrical components and the like as well as placement of the substrate and its assembly onto the edge of the planar optical structure.

For the triplexer embodiments described with respect to FIGS. 1 and 8, alignment of the photodetector assembly to the planar waveguides could proceed as follows. The photodetector assembly is singulated with the edges having a relationship to the photodetectors known within a few hundred microns in position and to within less than about 1-degree in angle. The planar-waveguide circuit is inserted into a fixture at a known orientation with similar accuracy. Electrical contact to the pads for the analog photodiode is established using electrical probes or a temporary attachment of wires. Light at a wavelength of 1550 or other suitable wavelength is injected into the common port of the planar-waveguide circuit. The photodetector substrate and assembly would be placed in a corresponding fixture. The actual position of each part in its fixture can be measured by a computer system using, for example, vision recognition. One of the fixtures, for instance the waveguide fixture, is capable of making micron-precision movements under command of a computer, and the analog port of the planar waveguide is brought into approximate alignment with the analog photodiode. In most applications, this is sufficiently aligned, the output level of the analog photodiode is measured to confirm the alignment and the photodetector alignment, and the substrate assembly is then bonded to the planar waveguide.

In some embodiments, for instance linearity requirements exceed those of typical applications, it may be necessary to further improve this initial alignment. In these cases, the output of the analog photodiode can be monitored while small adjustments are made to the alignment position. Feeding the results of these measurements back to the computer controlling the position of the waveguide chip, improved alignment position can be quickly determined using standard iterative algorithms. Since the geometries of the planar waveguides and the photodetector assembly are well-defined, the digital photodiode can be automatically aligned without additional feedback, and the assemblies then can be bonded together.

If a glass frit is used to secure the electro-optical interface with the planar optical structure or to cover at least a portion of the transparent substrate, for example, to insulate a metal cap from electrical connections on the transparent substrate surface, the glass frits generally are bonded in place with heat prior to securing any components with solder, although in principle the flow properties of the materials could be changed to avoid this processing order. Once the electrical connections are placed on the transparent substrate surface, the transparent substrate can be aligned along the edge of the planar optical structure since the configuration of the photodetector is fixed. However, it is generally more convenient to perform all or at least additional processing of the electro-optical interface prior to placement of the electro-optical interface onto the edge of the planar optical structure due to handling considerations. Also, one or more processing steps for a plurality of electro-optical interfaces can be performed on a larger transparent substrate block for convenience and cost savings for the formation of a plurality of devices. Once the processing on the larger substrate is complete, the substrate can be cut into individual interface components. Handling of the larger substrate block is generally significantly easier than handling the corresponding individual electro-optical interface devices. Assemblies can be cut from the larger substrate by common singulation devices, for instance utilizing a rotary dicing grinder, by scribing and cleaving, or by using a water jet.

To balance sensitivity and linearity of the photodetector, it is desirable for the optical beam diameter at the photodetector to be approximately the diameter of the photodetector active area. Also, if the disk corresponding to the active area of the photodetector is made smaller, the alignment of the photodetector becomes correspondingly based on smaller tolerances and the photodetector can receive smaller total power without damage. On the other hand, if the disk of the active area is made bigger, the device has a slower response and hence has a smaller bandwidth. The active areas for photodetectors suitable with digital data networks with data transfer rates from about 155 to about 2400 Megabits-per-second and for video bandwidths up to about 1000 Megahertz, the diameter of the active area of the photodiode would be roughly 40 to 80 microns.

The optical beam spreads after leaving the waveguide. However, directing the beam into a transparent substrate rather than air slows the spread due to the higher index-of-refraction of the substrate in comparison with air. Thus, the photodetector of the aforementioned size range would generally be placed about 50-200 microns from the end of the waveguide. This distance would account for the thickness of the transparent substrate, the thickness of the solder pads used to secure the photodetector and the thickness of any binder used to secure the transparent substrate to the planar optical structure. While the values of photodetector active area size and spacing from the waveguide are based on parameters generally applicable for optical communication systems presently in use, these can straightforwardly adjusted for advances in the technology that generally drive more compact configurations.

For embodiments in which no glass frit is used to secure the electro-optical interface to the planar optical structure, the electro-optical interface can be completed including soldering of components prior to securing the electro-optical interface to the planar optical structure. If a glass frit is not used to secure the electro-optical interface to the planar optical structure, a suitable adhesive can be used. Suitable adhesives include, for example, UV-initiated reactive organic adhesives, such as optical epoxies and UV acrylates. Most commercial optical adhesives are suitable for use with embodiments described herein, but most commercial applications would include adhesive selection considering additional factors specific for the application. Specific adhesive selection can generally be driven by reliability considerations accounting for the wavelengths and power levels of the transmitted optical signals, the environment they will be exposed to, and expected reliability characteristics. The use of an adhesive may simplify the processing of the electro-optical interface since the transparent substrate can be placed in a tray for use with a pick-and-place machine of the like for the placement of the photodetector and/or other electrical components. Similarly, if a glass frit is not used to insulate the metal cap from the metal interconnects on the transparent substrate surface, the components of the electro-optical interface can be soldered in place prior to the placement of any components of the cap, if a cap is used.

In some embodiments, a hermetic seal is not used over the photodetector. For these embodiments, processing steps relating to the placement of the cap can be eliminated. Similarly, other protective coatings can be applied as an alternative or as an addition to the metal cap.

Use of the Electro-Optical Systems

In general, the devices described herein can facilitate the termination of an optical communications network in a variety of contexts. In particular, these improved systems can be used for bringing an optical communications network closer to the end user. Thus, with the improved and less expensive electro-optical systems herein, a directed optical signal can be received for use at the ultimate user or closer to the ultimate user than may be practical with conventional systems. The optical receiver embodied by the electro-optical systems described herein can be the functional analog of a modem that serves an individual user, a local network neighborhood or the like.

One particular embodiment was described with respect to FIGS. 5-7. However, these embodiments can be modified straightforwardly for alternative embodiments with a digital video signal or for other types of terminations to fiber-optic networks. Similarly, additional photodetectors can be incorporated for additional digital and/or analog signals. Thus, the system can be adapted for different types of signals to be received by the end user/network as well as future modifications in the character of optical communications systems.

The embodiments described above are intended to be illustrative and not limiting. Additional embodiments are within the claims below. Although the present invention has been described with reference to preferred embodiments, workers skilled in the art will recognize that changes may be made in form and detail without departing from the spirit and scope of the invention.

What we claim is:

1. An electro-optical system comprising a planar optical structure and an electro-optical interface, the planar optical structure comprising a planar waveguide that terminates at the edge of the planar structure and the electro-optical interface comprising a transparent substrate, which is transparent at a selected wavelength, attached at the edge of the planar structure to receive light from the waveguide and a first photodetector secured to the transparent substrate at a position to receive the light from waveguide through the transparent structure and wherein at least one surface of the transparent substrate has a coating that rejects selected undesirable wavelengths from reaching the first photodetector.

2. The electro-optical system of claim 1 wherein the edge of the planar structure has a face, the transparent substrate is attached at a first surface to the face and the photodetector is secured at a second surface of the substrate opposite the first surface.

3. The electro-optical system of claim 1 wherein the coating is a single layer antireflective coating.

4. The electro-optical system of claim 1 wherein the coating is a multiple layer antireflective coating.

5. The electro-optical system of claim 1 wherein the planar structure further comprises an optical multiplexer optically connected to the waveguide.

6. The electro-optical system of claim 1 wherein the planar optical structure comprises an optical fiber coupler.

7. The electro-optical system of claim 1 wherein the transparent substrate comprises a silicate glass.

8. The electro-optical system of claim 1 wherein the transparent substrate comprises a polymer.

9. The electro-optical system of claim 1 wherein the transparent substrate comprises silicon.

10. The electro-optical system of claim 1 wherein the first photodetector is selected to receive a digitally-modulated optical signal.

11. The electro-optical system of claim 1 wherein the first photodetector is selected to receive an analog-modulated optical signal.

12. The electro-optical system of claim 1 wherein the electro-optical interface further comprises an electrical conductor along the surface of the transparent substrate in electrical connection with the photodetector.

13. The electro-optical system of claim 12 wherein the electro-optical interface comprises an electrical component in electrical contact with the electrical conductor.

14. The electro-optical system of claim 1 wherein the planar optical structure comprises a second planar waveguide and wherein the electro-optical interface comprises a second photodetector aligned to receive light directly from the second waveguide through the transparent substrate.

15. The electro-optical system of claim 13 wherein the first photodetector is selected to receive digitally-modulated optical signals and the second photodetector is selected to receive analog-modulated optical signals.

16. The electro-optical system of claim 12 wherein the electrical conductor further comprises a plurality of connection pads electrically connected with a plurality of electrically separate conduction paths.

17. The electro-optical system of claim 1 wherein the electro-optical interface comprises a metal cap forming a hermetic seal over the first photodetector.

18. The electro-optical system of claim 1 wherein the electro-optical interface is connected to an edge at an interior location of the planar optical structure.

19. A method for forming an electro-optical system comprising a planar optical structure and an electro-optical interface, the planar optical structure comprising a planar optical waveguide that terminates at the edge of the planar structure and the electro-optical interface comprising a transparent substrate, which is transparent at a selected wavelength, the method comprising:

attaching a transparent substrate at a first surface of the substrate to the face of the edge of the planar optical structure; and fastening a photodetector to the transparent substrate at a second surface of the substrate opposite the first surface and aligned at a position to receive light from the planar waveguide through the transparent substrate.

* * * * *